(12) United States Patent
Kelosky (10) Patent No.: US 11,279,186 B2
(45) Date of Patent: Mar. 22, 2022

(54) TRAILER TONGUE HINGE DEVICE

(71) Applicant: Thomas Troy Kelosky, Fombell, PA (US)

(72) Inventor: Thomas Troy Kelosky, Fombell, PA (US)

( * ) Notice: Subject to any disclaimer, the term of this patent is extended or adjusted under 35 U.S.C. 154(b) by 0 days.

(21) Appl. No.: 17/384,732

(22) Filed: Jul. 24, 2021

(65) Prior Publication Data

US 2022/0041023 A1    Feb. 10, 2022

Related U.S. Application Data

(60) Provisional application No. 63/063,723, filed on Aug. 10, 2020.

(51) Int. Cl.
*B60D 1/155* (2006.01)

(52) U.S. Cl.
CPC .................................. *B60D 1/155* (2013.01)

(58) Field of Classification Search
CPC ...... B60D 1/155; B60D 1/167; B60D 1/1675; B60D 1/54; B62D 21/04; B62D 21/20
See application file for complete search history.

(56) References Cited

U.S. PATENT DOCUMENTS

| | | | | |
|---|---|---|---|---|
| 5,890,617 A * | 4/1999 | Rowland | ............... | B60D 1/155 280/491.3 |
| 6,203,049 B1 * | 3/2001 | Gibson | ............... | A01B 59/042 280/494 |
| 6,364,337 B1 * | 4/2002 | Rowland | ............... | B60D 1/155 280/479.2 |
| 6,869,095 B2 * | 3/2005 | Roll | ............... | B60D 1/065 280/422 |
| 7,237,791 B1 * | 7/2007 | Stettler | ............... | B60D 1/155 280/482 |
| 7,410,184 B2 * | 8/2008 | Roll | ............... | B60D 1/065 280/491.1 |
| 7,494,147 B2 * | 2/2009 | Rowland | ............... | B60D 1/155 280/491.3 |
| 7,527,281 B1 * | 5/2009 | Rowland | ............... | B60D 1/155 280/414.1 |
| 7,600,773 B2 * | 10/2009 | Stettler | ............... | B60P 3/1083 280/141 |
| 7,669,877 B2 * | 3/2010 | Roll | ............... | B60D 1/64 280/491.3 |
| 7,731,219 B2 * | 6/2010 | Okerlund | ............... | B60D 1/155 280/491.3 |

(Continued)

*Primary Examiner* — Tony H Winner
*Assistant Examiner* — Michael R Stabley
(74) *Attorney, Agent, or Firm* — Gwen R. Acker Wood; Acker Wood IP Law LLC (57) ABSTRACT

The present invention provides an improved trailer tongue hinge device that is far superior to prior art trailer tongue hinges. The inventive trailer tongue hinge device is comprised of two identical parts, i.e., units, which impart an equal load on either side of the hinge device as well as five shear points and wear locations that spreads out stress and wear on the hinge device, rather than two shear points and wear locations encountered in the prior art. Further, the improved trailer tongue hinge device is manufactured from mild steel that is capable of bending long before it might break, which makes the inventive hinge device about three times stronger than prior hinges, thus imparting a much longer lifetime and safety profile compared to prior art hinges.

18 Claims, 9 Drawing Sheets

(56) References Cited

U.S. PATENT DOCUMENTS

| | | | | |
|---|---|---|---|---|
| 7,967,322 B1* | 6/2011 | Rowland | ................. | B60D 1/54 |
| | | | | 280/491.1 |
| 2008/0315561 A1* | 12/2008 | Anderson | ................ | B60D 1/54 |
| | | | | 280/491.1 |
| 2018/0346042 A1* | 12/2018 | Elliott | .................... | B62D 63/08 |

* cited by examiner

TRAILER TONGUE HINGE DEVICE

CROSS REFERENCE TO RELATED APPLICATIONS

The present application claims priority to U.S. Provisional Application No. 63/063,723, filed Aug. 10, 2020, which is incorporated herein by reference in its entirety.

FIELD OF THE INVENTION

The present invention relates to trailer tongue hinges and, in particular, to an improved trailer tongue hinge comprised of two identical units that together provides surprising strength, wearability, and longevity.

BACKGROUND OF THE INVENTION

Trailer tongue hinges are used on boat and utility trailers to allow a trailer tongue to swing back on itself in order to reduce its overall length so that the trailer tongue can fit more easily in a garage or other storage area where there are space limitations.

Currently available trailer tongue hinges are manufactured from two dissimilar parts, such as the Fulton and Reese hinges, each typically having two shear points where all the stress and wear are encountered when in use. In addition, because the two parts of the hinge are dissimilar, this exerts an unequal load on either side of the hinge, which causes stress and wear on the entire device. Further, prior art hinges are manufactured from cast steel, which when the steel fails, the hinge will break or crack. Thus, the shortcomings of prior art hinges limit its lifetime and overall safety profile.

There exists a need, therefore, for an improved trailer tongue hinge that overcomes all of the shortcomings of prior art hinges.

SUMMARY OF THE INVENTION

The present invention fulfills this need by providing an improved trailer tongue hinge that is far superior to prior art hinges. This is accomplished by providing a trailer tongue hinge device having two identical parts, i.e., units, which impart an equal load on either side of the hinge device as well as five shear points rather than two as encountered in the prior art, which spreads out the wear and tear of the device; and is manufactured from mild steel that is capable of bending long before it would break, which makes the inventive hinge device about three times stronger than prior hinges, thus imparting a much longer lifetime and safety profile compared to prior art hinges.

In as aspect of the invention, there is provided an improved trailer tongue hinge device. The trailer tongue device is comprised of two identical trailer tongue hinge units. Each trailer tongue hinge unit comprises a box frame having a first side, a second side, a top side, a bottom side, a front end, and a rear end. The box frame has an opening therethrough and a plurality of holes on the bottom side.

A top plate is adjacent to the top side of the box frame. Both the top plate and the box frame have the same plurality of holes therethrough. A plurality of wing-like ears is adjacent the first side and the second side of the box frame and the top plate, with each of the plurality of wing-like ears having an opening therein. A plurality of bushings is adjacent to the plurality of wing-like ears, with each of the plurality of bushings having an opening therein. The two identical trailer tongue hinge units are positioned next to one another by placing the top side and the front end of one trailer tongue hinge unit next to the bottom side and front end of the other trailer tongue hinge unit. The two identical hinge units are secured to one another by inserting a wing bolt into wing bolt holes and into the wing-like ears and the bushings that are on the same side as the wing bolt holes.

In a closed configuration, a hinge pin is inserted into the wing pin holes and the wing-like ears and the bushings on the same side as the wing pin holes. In an open configuration, the wing pin is removed so that the two hinge units are able to swing open away from each other.

The trailer tongue hinge device is configured so that one end of the hinge device is slid onto one end of a cut trailer tongue and the other end of the hinge device is slid onto the other end of the cut trailer tongue. Trailer tongue stop plates which vary in size depending on the size of the trailer tongue, located on the front ends of the box frames of the two hinge units ensure that the hinge device is placed in a correct position when slid onto the cut ends of the trailer tongue. The hinge device is secured to the cut ends of the trailer tongue with bolts that are placed into the box frame holes, the top plate holes, and holes placed in the two ends of the cut trailer tongue. When the hinge pin is removed, the hinge device is able to swing apart into a fully-open position so that the two hinge units are positioned substantially side by side, which allows one end of the cut trailer tongue to be positioned 180 degrees from the other end of the cut trailer tongue.

BRIEF DESCRIPTION OF THE DRAWINGS

A fuller understanding of the invention can be gained from the following description when read in conjunction with the accompanying figures, where like reference numerals refer to identical or functionally similar elements throughout the separate views, which illustrate some, but not the only and exclusive, examples of embodiments of the invention and, as such, the figures disclosed herein are to be considered illustrative rather than limiting. In the drawings.

DETAILED DESCRIPTION OF THE INVENTION

Referring now to FIGS. 1 through 10, the improved trailer tongue hinge device of the present invention is shown generally throughout and is comprised of two identical trailer tongue hinge units. The two identical hinge units are placed adjacent to one another, with the top of one hinge unit placed adjacent to the bottom of the other hinge unit.

Figure 1:
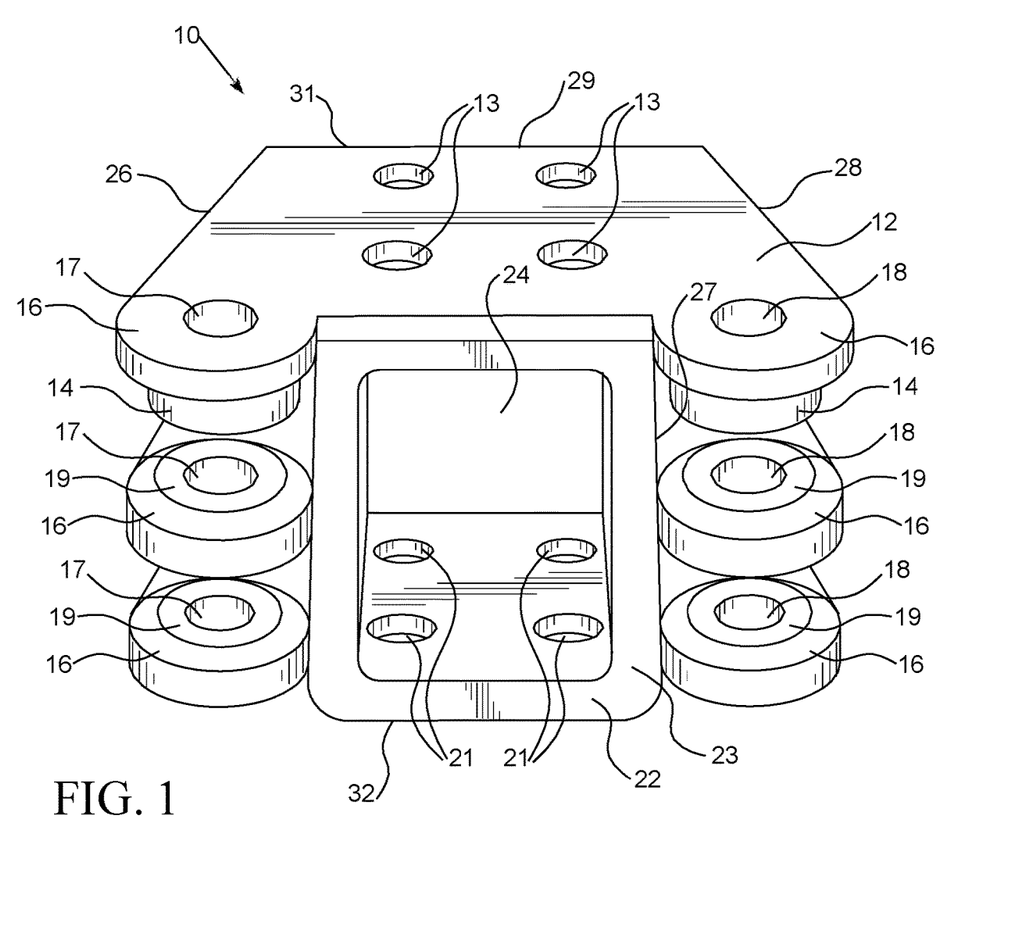
FIG. 1 is a perspective front view of the trailer tongue hinge unit in accordance with an embodiment of the invention.

As shown in FIG. 1, each trailer tongue hinge unit 10 comprises a box frame 23 having a first side 26, a second side 28, a top side 31, a bottom side 32, a front end 27, and a rear end 29. The box frame 23 has an opening therethrough 24 and a plurality of box frame bolt holes 21 on its bottom side 32. A top plate 12 is adjoined to the top side 31 of the box frame 23, with the top plate 21 having a plurality of top plate bolt holes 13 therethrough. In an embodiment, the box frame 23 and the top plate 12 each have four bolt holes 21, 13. The invention contemplates that the dimensions of the box frame 23 varies depending on the size of the trailer tongue.

A plurality of wing-like ears 16 are positioned on the first side 26 and the second side 28 of the box frame 23. Each of the plurality of wing-like ears 16 on the first side 26 has a central opening therein 17 to accommodate a wing bolt 36 and each of the plurality of wing-like ears 16 on the second side 28 has a central opening therein 18 to accommodate a wing pin 34 (shown in FIG. 2). The invention contemplates that the openings 17, 18 can be reversed so that the wing pin 34 is on the first side 26 and the wing bolt 36 is on the second side 28 of the hinge unit 10. In an embodiment, there are three wing-like ears 16 on the first side 26 of the box frame 23 and three wing-like ears 16 on the second side 28 of the box frame 23. The three wing-like ears 16 on each side 26, 28 of the box frame 23 are positioned equidistant from one another. The two wing-like ears 16 located on the top side 31 of the box frame 23 are part of the top plate 12.

The two top plate 12 wing-like ears 16 each has a bushing 14 positioned in the center of the wing-like ear 16 which protrude downwardly. Each of second and third wing-like ears 16 on both the first side 26 and the second side 28 of the box frame 23 also has a bushing 19 positioned in the center of the wing-like ears 16, with these bushings 19 protruding slightly upwardly and downwardly from the wing-like ears 16. Each of the bushings 14, 19 also has an opening therein 17, 18 to allow either a wing bolt 36 or a wing pin 34 to be inserted therein.

Adjacent to the front end 27 of the box frame 23 and positioned on the periphery of the opening 24 of the box frame 23 is a tongue stop plate 22.

All of the parts of the trailer tongue hinge unit 10 which are adjacent to one another are adjoined to one another by welding.

Figure 2:
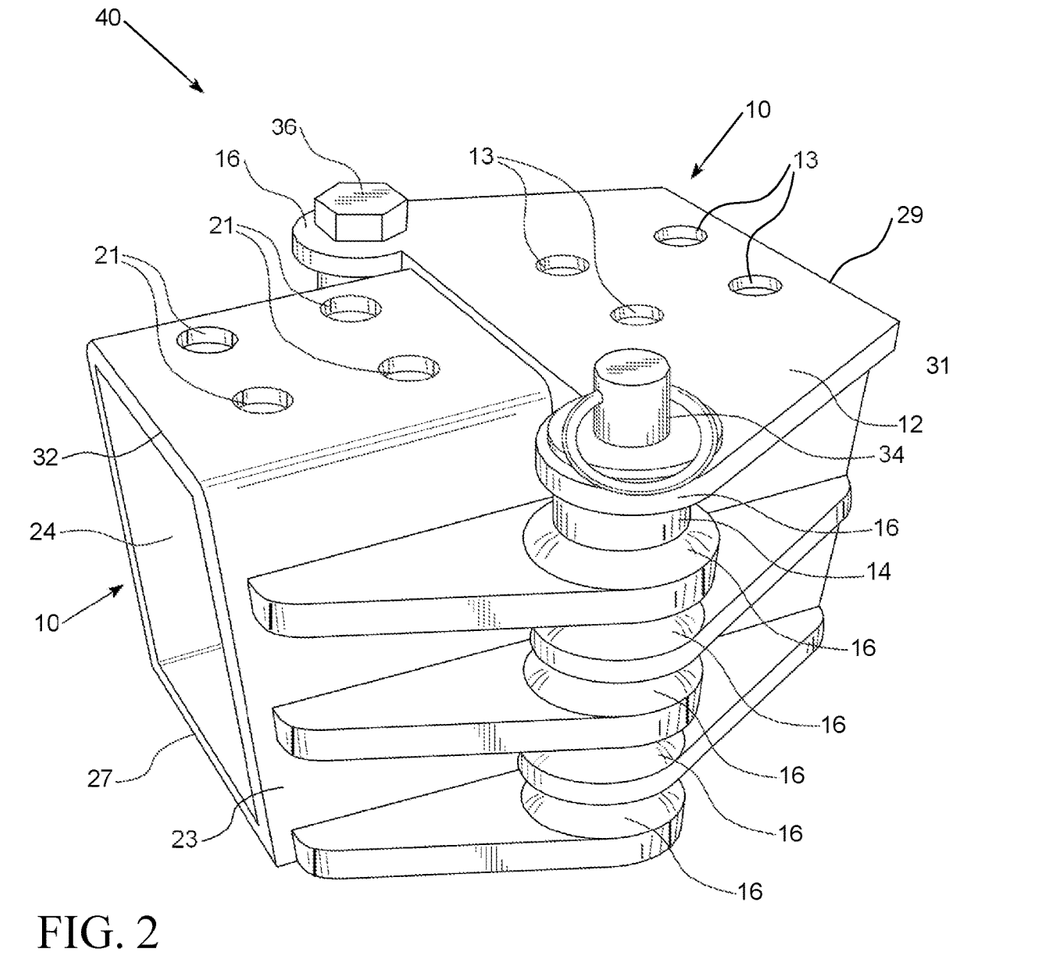
FIG. 2 is a perspective side view of two trailer tongue hinge units positioned adjacent to one another to form the trailer tongue hinge device, showing a wing bolt inserted into the wing bolt hole to secure the two trailer tongue hinge units to one another and showing a wing pin inserted in to the wing pin hole to maintain the hinge device in a closed configuration.
Figure 3:
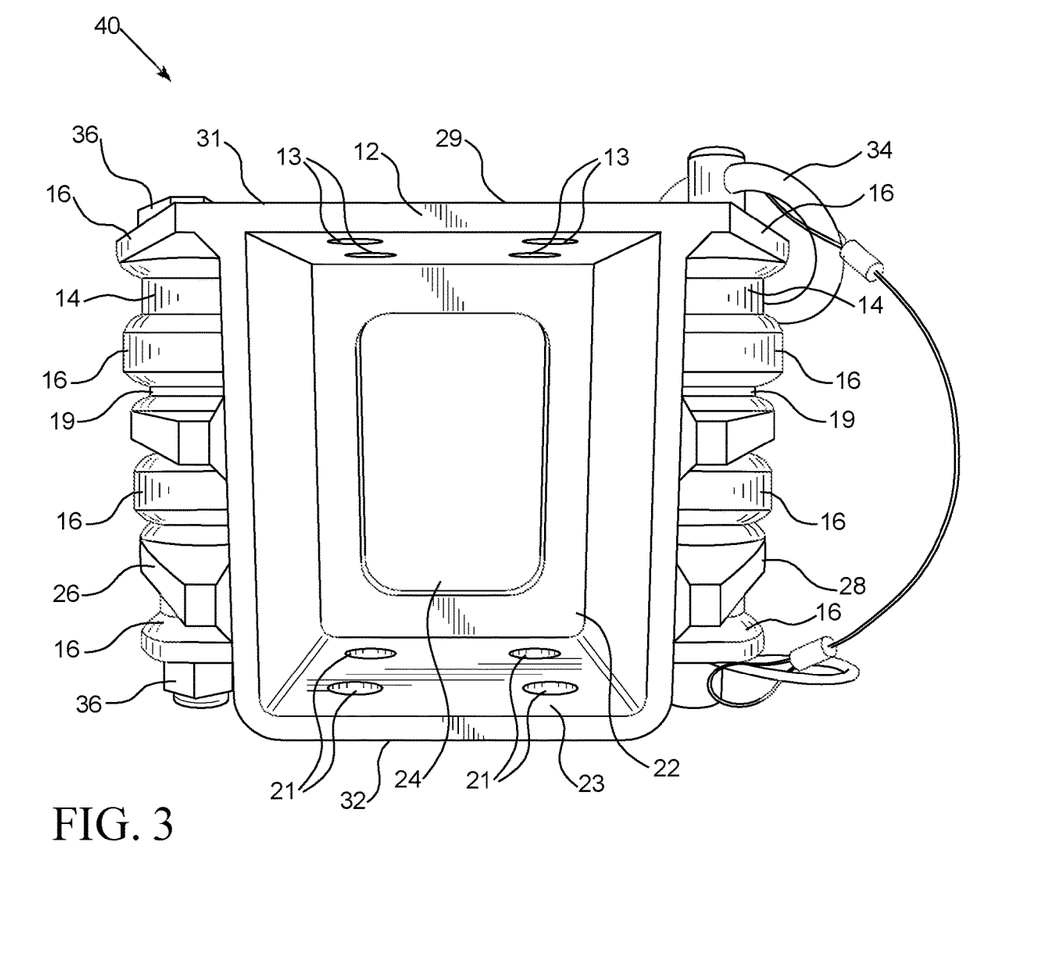
FIG. 3 is a rear view of the trailer tongue hinge device in accordance with an embodiment of the invention.
Figure 4:
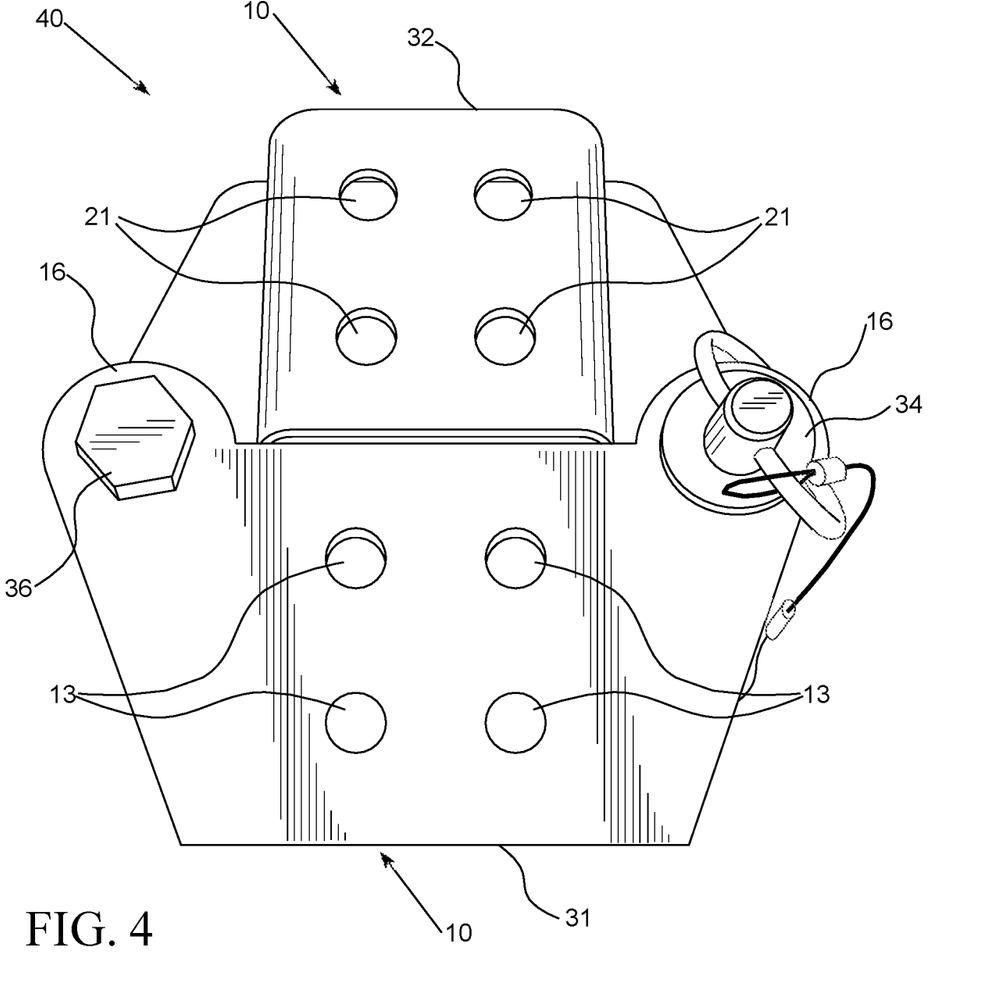
FIG. 4 is a top view of the trailer tongue hinge device in accordance with an embodiment of the invention.
Figure 6:
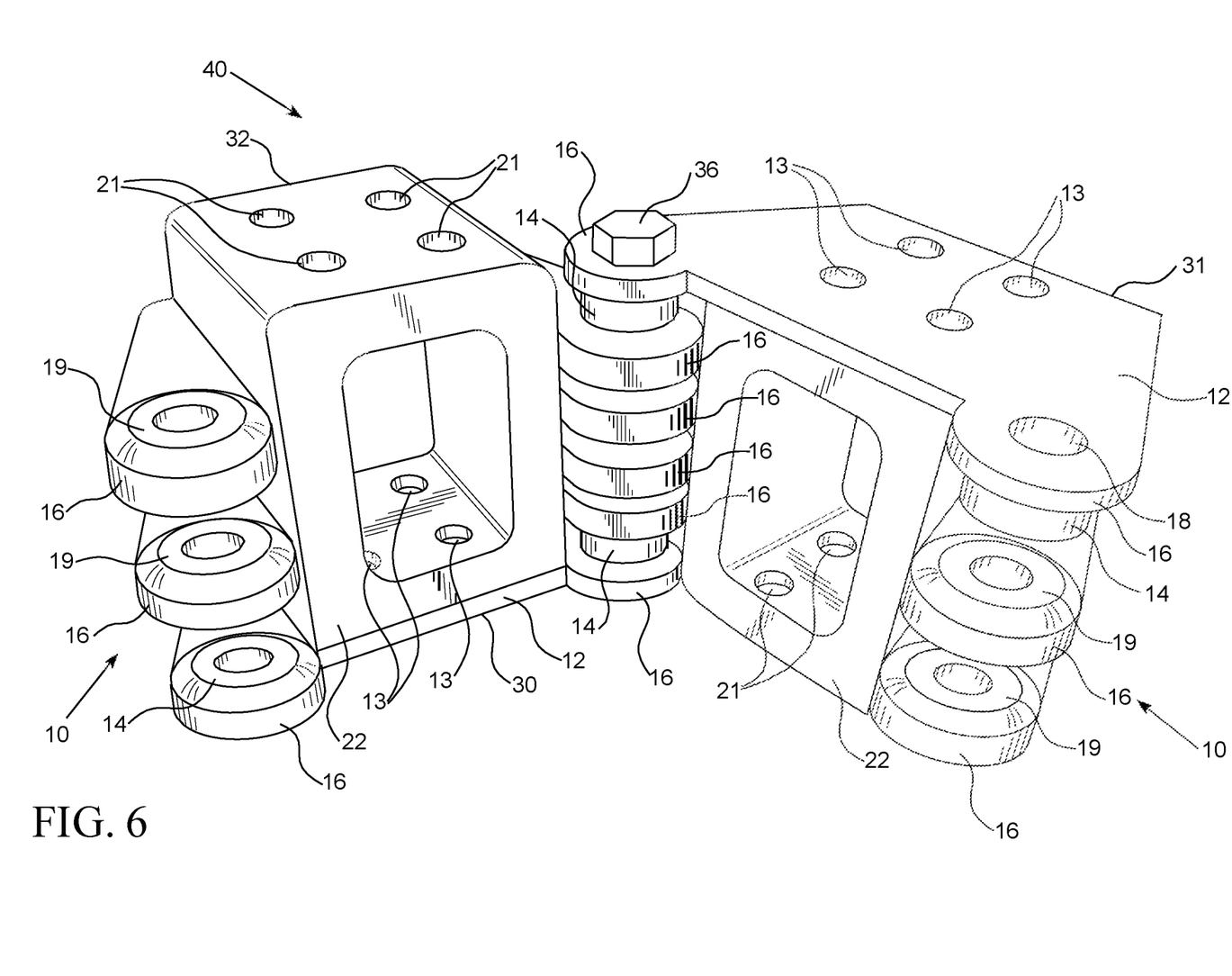
FIG. 6 is a perspective front view of the trailer tongue hinge device in a semi-opened configuration in accordance with an embodiment of the invention.
Figures 7, 8:
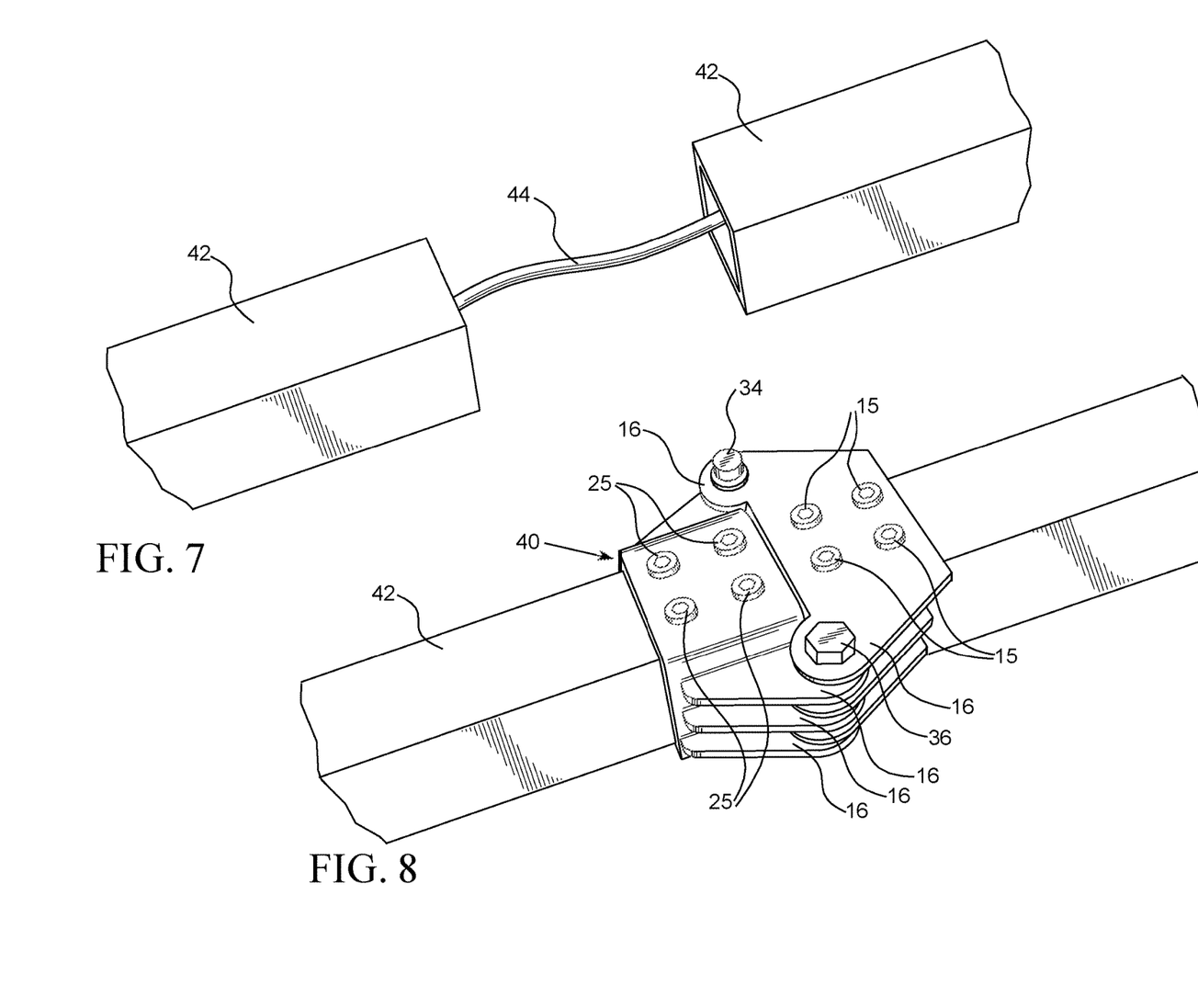
FIG. 7 is a perspective view of a portion of a typical trailer tongue used with the trailer tongue device in accordance with an embodiment of the invention.
FIG. 8 is a perspective view of the trailer tongue hinge device secured to the trailer tongue shown in FIG. 7.

As best shown in FIGS. 2, 4, and 8, the two identical hinge units 10 are positioned next to one another, with the top side 31 and the front end 27 of one hinge unit 10 placed next to the bottom side 32 and the front end 27 of the other hinge unit 10. As can be seen in FIGS. 2, 3, 5, 8, and 10, when the two identical hinge units 10 are positioned together as described, the wing-like ears 16 of one hinge unit 10 interdigitate above and below the wing-like ears 16 of the other hinge unit 10. The two hinge units 10 are secured together by inserting a wing bolt 36 into a wing bolt opening 17 and the openings in the wing-like ears 16 and bushings 14, 19 that are on the same side as the wing bolt opening, best shown in FIG. 6.

Figure 5:
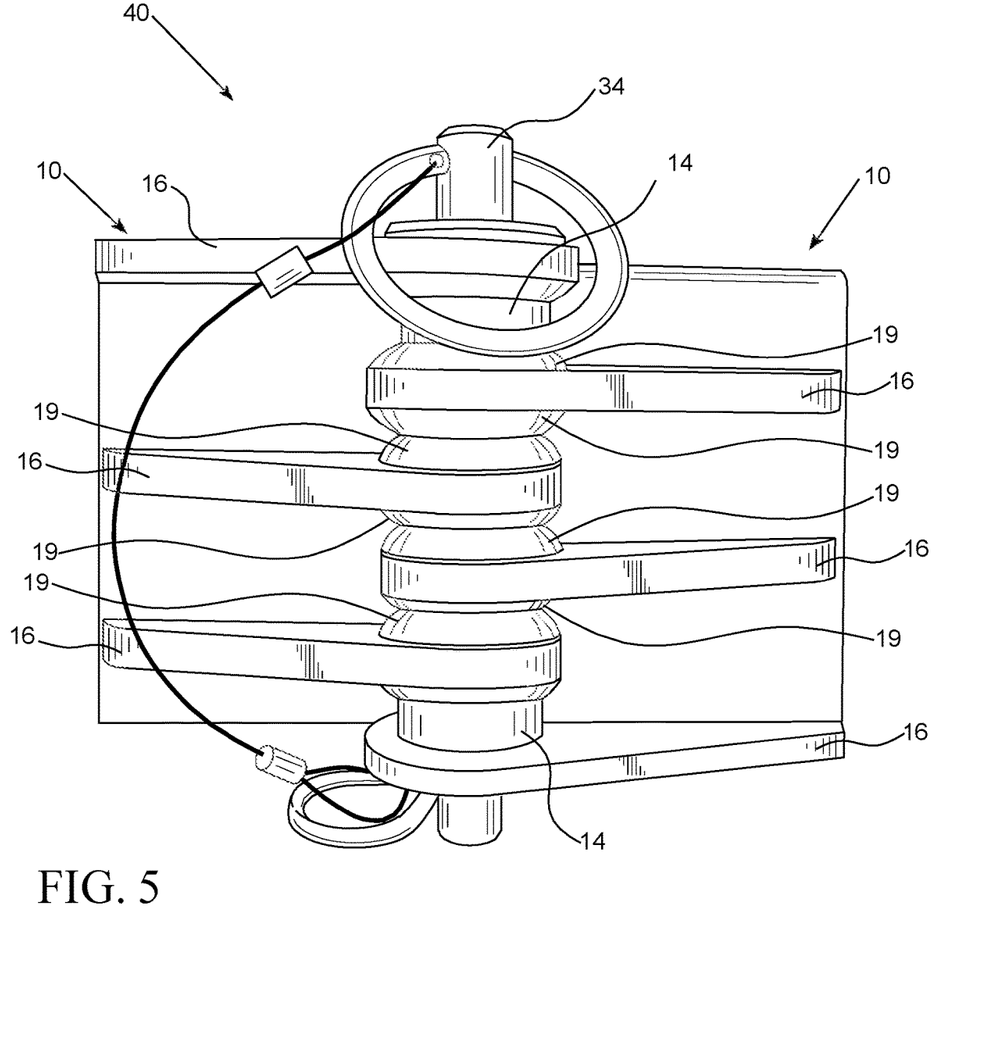
FIG. 5 is a rear view of the trailer tongue hinge device in accordance with an embodiment of the invention.

FIGS. 2 and 4 best show the trailer tongue hinge device 40 in a closed configuration. As shown in FIGS. 2, 3, and 5, in addition to the insertion of the wing bolt 36, a wing pin 34 is inserted into the wing pin opening 18 and in the openings in the wing-like ears 16 and bushings 14, 19 that are on the same side as the wing pin opening, best seen in FIGS. 2, 3, 5, and 8.

FIG. 6 shows the trailer tongue hinge device 40 in an open configuration. By removing the wing pin 34 from the wing pin opening 18 and the openings in the wing-like ears 16 and bushings 14, 19, the two hinge units 10 can open by swinging away from one another.

Referring now to FIGS. 7 and 8, in use, the trailer tongue hinge device 40 is configured so that one end of the hinge device 40 is slid onto one end of a cut trailer tongue 42 and the other end of the hinge device 40 is slid onto the other end of the cut trailer tongue 42. Wiring 44 contained within the trailer tongue 42 can easily be placed in the box frame openings 24 of the two hinge units 10 of the hinge device 40. Additionally, the circumferential dimensions of the tongue stop plate 22 are variable and can be sized to the dimensions of the trailer tongue 42 in order to ensure a proper, snug fit of the trailer tongue 42 with the hinge device 40. The hinge device 40 then is secured to the cut ends of the trailer tongue with bolts 15 that are placed into the top plate holes 13, the box frame holes 21, and holes that have been drilled into the two ends of the cut trailer tongue.

Figure 9:
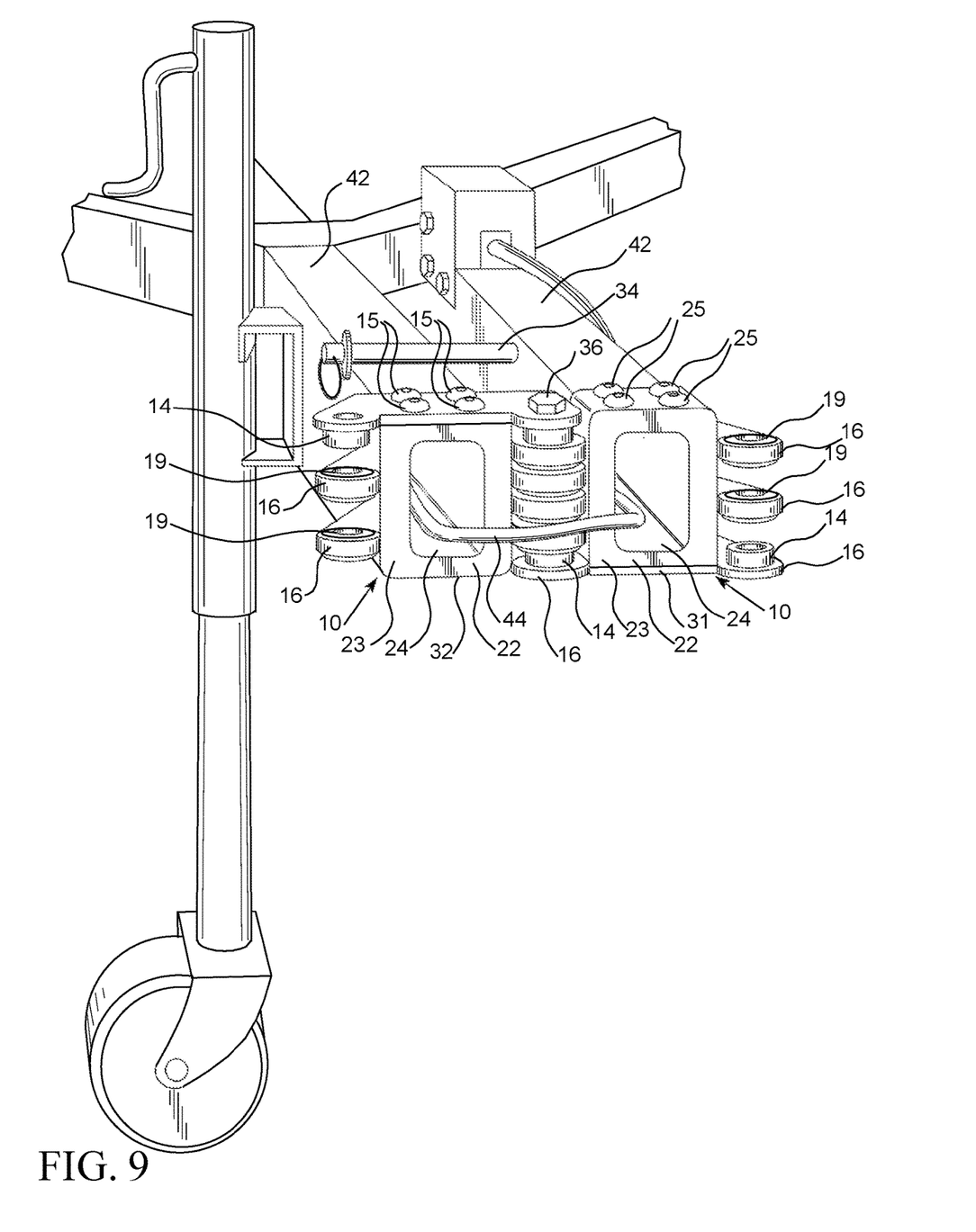
FIG. 9 is a perspective front view of the trailer tongue hinge device in a fully-opened configuration secured to the trailer tongue.

The trailer tongue hinge device, for example when installed on boat trailer tongue, typically extends about three feet to about five feet in front of the boat. When a user wishes to park the trailer in a tight storage area or a garage, the user removes the hinge pin 34 which allows the hinge device 40 to swing open so that the two hinge units 10 are positioned substantially side by side so that one end of the cut trailer tongue 42 is positioned about 180 degrees from the other end of the cut trailer tongue 42, as shown in FIG. 9.

Figure 10:
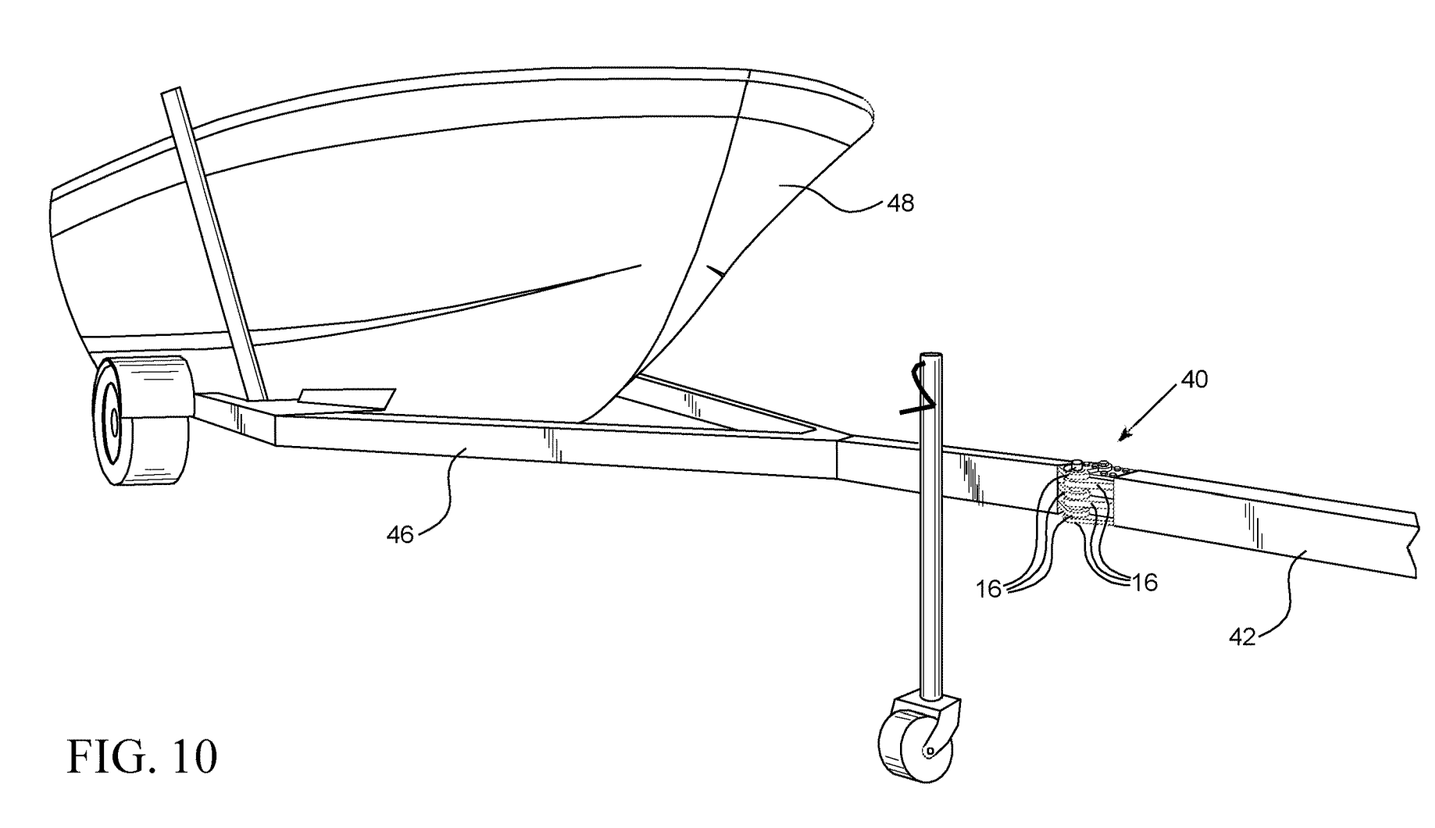
FIG. 10 is an illustration of the trailer tongue hinge device as used on a trailer tongue for storing and transporting a boat.

In addition, when a trailer tongue, such as the boat trailer tongue 42 shown in FIG. 10, is parked outside or in an insecure location, a locking pin (not shown) may be used instead of the wing pin 34 to ensure that the trailer tongue 42 cannot be removed from its location.

The improved trailer tongue hinge thus provides five stress and wear locations which are spread out on each side of the device compared to conventional trailer tongue hinges which have two stress and wear locations. Further, the identicality of the two hinge units of the hinge device provides equal load stress on each side of the hinge device. Thus, both the spread out stress and wear locations and the equal load stress of the inventive hinge device provides as much as three times more strength and greater longevity compared to conventional trailer tongue hinges.

EXAMPLES

The dimensions of the present invention is more particularly described in the following non-limiting example, which is intended to be illustrative only, as numerous modifications and variations therein will be apparent to those skilled in the art.

Example 1—Trailer Tongue Hinge Dimensions

The top plate is manufactured from a carbon steel plate, ¾" thick, CNC cut to the custom shape with the overall size being 4½"×7⁵⁄₁₆" with four ½" holes for mounting on a trailer tongue. The top plate bushing is a solid piece of 1¾" round bar cut to a length of 0.53 inches and then welded to the top plate. The wing-like ears are CNC cut from a carbon steel plate ⅜" thick, 1⅞" wide and 4¾" long with a 1¾" hole therein to the same shape of the sides of the top plate. The second and third wing-like ear bushings, which are located under the top plate bushing, are 1¾" diameter round bars cut to a length of 0.81 inches.

The box frame is manufactured from carbon steel plate ¾" thick×3½" high×11⅛" long (which size can vary depending on the size of the trailer tongue). Each of the four holes in the box frame are ½" in diameter.

The tongue stop plate is CNC cut from carbon steel plate ⅛" thick×3⅛" high×4¹⁄₁₆" wide (which size can vary for different size trailer tongues). It has an opening of 2¹⁄₁₆"×3¹⁄₁₆" which keeps the hinge device in the correct location when slid onto the trailer tongue.

While specific embodiments have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the device described herein, which is to be given the full breadth of the appended claims and any and all equivalents thereof.

What is claimed is:

1. An improved trailer tongue hinge device, comprising: two identical trailer tongue hinge units, each trailer tongue hinge unit comprising:
    a box frame having a first side, a second side, a top side, a bottom side, a front end, and a rear end; said box frame having an opening therethrough and a plurality of holes on the bottom side;
    a top plate adjoined to the top side of the box frame, said top plate and box frame having a plurality of holes therethrough;
    a plurality of an equal number of wing-shaped ears positioned on the first side and the second side of the box frame and top plate, each of the plurality of the equal number of wing-shaped ears having an opening therein; and
    a plurality of bushings adjoined to the plurality of the equal number of wing-shaped ears, each of said plurality of bushings having an opening therein, wherein the two identical trailer tongue hinge units are positioned adjacent to one another by placing the top side and the front end of one trailer tongue hinge unit adjacent to the bottom side and the front end of the other trailer tongue hinge unit.

2. The improved trailer tongue hinge device of claim 1, wherein the two identical hinge units are secured to one another by inserting a wing bolt into wing bolt holes and into the wing-shaped ears and the bushings that are on the same side as the wing bolt holes.

3. The improved trailer tongue hinge device of claim 1, wherein a stop plate having an opening therethrough is adjoined inside the periphery of the box frame at the front end of the box frame.

4. The improved trailer tongue hinge device of claim 1, wherein three wing-shaped ears are located on the first side of the box frame and three wing-shaped ears are located on the second side of the box frame.

5. The improved trailer tongue hinge device of claim 4, wherein each of the wing-shaped ears are positioned equidistant from one another.

6. The improved trailer tongue hinge device of claim 5, wherein the wing-shaped ears located on the top side of the box frame are part of the top plate.

7. The improved trailer tongue hinge device of claim 6, wherein the top plate wing-shaped ears each has a bushing having a center opening therein, said bushings protruding down from the wing-shaped ears.

8. The improved trailer tongue hinge device of claim 7, wherein a second and a third wing-shaped ear are located under the top plate wing-shaped ear on each side of the box frame, each of the second and the third wing-shaped ears having a bushing located in its center and an opening therein and protruding out from both an upper side and an under side of the second and the third wing-shaped ears.

9. The improved trailer tongue hinge device of claim 8, wherein in a closed configuration, a wing pin is inserted into wing pin holes, the wing-shaped ears, and the bushings that are on the same side as the wing pin holes.

10. The improved trailer tongue hinge device of claim 9, wherein in an open configuration, the wing pin is removed so that the two hinge units are able to swing open.

11. The improved trailer tongue hinge device of claim 9, wherein a locking pin may be placed in the wing pin hole in place of the wing pin, said locking pin ensuring that when the trailer is in an insecure location the hinge device is not able to be removed from its location.

12. The improved trailer tongue hinge device of claim 1, wherein the hinge device is configured so that one end of the hinge device is slid onto one end of a cut trailer tongue and the other end of the hinge device is slid onto the other end of the cut trailer tongue, wherein wiring contained within the trailer tongue is placed in the box frame openings of the two hinge units of the hinge device.

13. The improved trailer tongue hinge device of claim 12, wherein the dimensions of the stop plate are variable to accommodate different-sized trailer tongues to ensure a snug fit of the trailer tongue with the hinge device.

14. The improved trailer tongue hinge device of claim 13, wherein the hinge device is secured to the cut ends of the trailer tongue with bolts that are placed into the box frame holes, the top plate holes, and holes placed in the two ends of the cut trailer tongue.

15. The improved trailer tongue hinge device of claim 14, wherein when the wing pin is removed and the hinge device is configured in the open position, the hinge device is capable of opening so that the two hinge units are positioned substantially side by side so that one end of the cut trailer tongue is capable of being positioned 180 degrees from the other end of the cut trailer tongue.

16. The improved trailer tongue hinge device of claim 1, wherein the device is manufactured from hot rolled mild steel.

17. The improved trailer tongue hinge device of claim 16, wherein the adjacent portions of the hinge unit are welded together.

18. The improved trailer tongue hinge device of claim 17, wherein the hinge device provides five stress and wear locations that are spread out on each side of the device, wherein the identicality of the two hinge units of the hinge device provides equal load stress on each side of the hinge device, wherein the spread-out stress and wear locations and the equal load stress provides enhanced strength and longevity to the hinge device.

* * * * *